(No Model.)

W. A. MACLEOD.
ACCUMULATOR.

No. 491,726. Patented Feb. 14, 1893.

WITNESSES.
Robt Wallace,
C. E. Nolte

INVENTOR
Wm A. Macleod.

UNITED STATES PATENT OFFICE.

WILLIAM A. MACLEOD, OF BOSTON, MASSACHUSETTS.

ACCUMULATOR.

SPECIFICATION forming part of Letters Patent No. 491,726, dated February 14, 1893.

Application filed December 17, 1890. Serial No. 374,978. (No model.)

*To all whom it may concern:*

Be it known that I, WILLIAM A. MACLEOD, of Boston, county of Suffolk, State of Massachusetts, have invented certain new and useful Improvements in Accumulators, of which the following is a specification.

My present invention is an improvement on the secondary battery shown and described in Letters Patent of the United States No. 441,413, dated November 25, 1890, granted to George E. Hatch. An accumulator cell constructed in accordance with said Letters Patent consists of porous plates which support the active material and which separate the conducting plates, the porous plates being in practice, however formed with depressions in the form of transverse grooves instead of pits which are shown in said Letters Patent No. 441,413. Porous plates thus grooved look like those shown in the accompanying drawings, that is, they have a series of transverse parallel grooves in which the active material is placed.

My invention consists in the construction of the porous plates as hereinafter set forth, which aids in insuring the absorption or taking up by the porous plates of the electrolyte so that the porous plates are completely saturated thereby and charged therewith; all as is more particularly pointed out in the claims which are appended hereto and made a part hereof.

Figure 1:
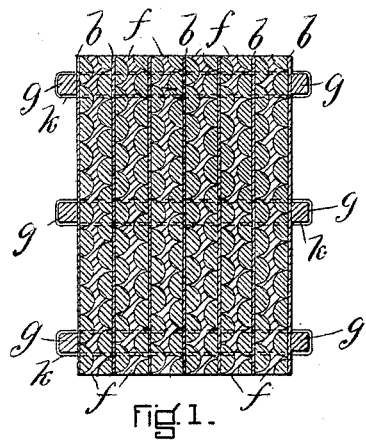
Figure 4:
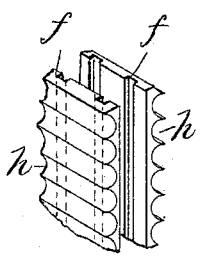
Figure 5:
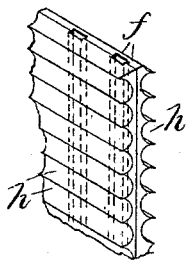
Figure 6:
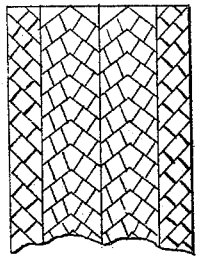
Figure 3:
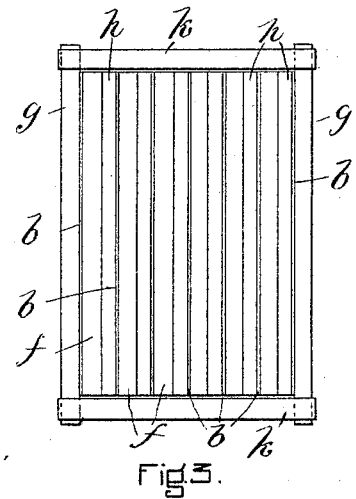
Figure 2:
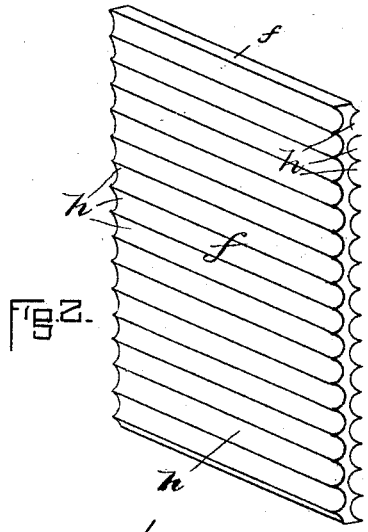

In the drawings, Figure 1 is a section showing a cell composed of six of these porous plates and a corresponding number of electrodes, the cell being shown out of its jar or case. Fig. 2 is a perspective view of one of the porous plates. Fig. 3 is a plan view showing my method of clamping or securing the plates and electrodes together. Figs. 4, 5 and 6 show modified forms of porous plate.

The receiver or jar or case in which the cell is placed when in use is not shown but may be of any desired shape and of any suitable material.

$b$ are the metallic conducting plates which are preferably of lead and which may be made very thin. Seven of these electrodes are employed in a cell such as is shown Fig. 1 but, as will be obvious, the number of electrodes will vary with the number of porous plates employed in the cell. The positive and negative electrodes are connected in any usual way.

Between the electrodes or conducting plates I place a series of porous plates $f$ of earthenware or similar, suitable acid-resisting material. These plates are provided on either side, if both sides be used, as will commonly be the case, with a number or depressions, shown in the accompanying drawings as grooves $h$, the precise shape of the depressions being immaterial. The grooves are preferably formed transversely of the plate but may be vertically thereof when the cell is set up.

The active material of the cell is applied to the porous plate, the depressions therein being filled with said material. Any active material may be employed, red lead being the material commonly used. When the porous plates are properly supplied with the active material the cell is built up by placing between each porous plate and the adjacent one a conducting plate, and the porous plates are so constructed that the sharply defined projecting parts or ridges $k$ of every alternate porous plate will be opposite the depressions $h$ of the adjacent porous plate, as shown Fig. 1. After the cell is built up the plates are clamped securely together by means of clamps $g$, preferably three sets of clamps being employed to each cell as shown. The pressure of the clamps tends to force the ridges or projections on one of the porous plates into the grooves of the adjacent plate. As the ridges of one porous plate are opposite the grooves of the adjacent plate and the active material, as also the conducting plate, is comparatively soft and yielding, the surfaces of the active material may be brought perfectly into contact with the surfaces of the conducting plates. The conducting plates are usually of lead and as above stated are yielding so that in this way the contact may be made very perfect.

For the purpose of binding the plates together bands of rubber have been employed. These, however, are objectionable and in place thereof I use clamps which consist of two strips $g$ of rigid acid-resisting material, as, for example, glass, which I secure together at each end by strips $k^2$ of yielding, contractile material, such for example as rubber bands, as such material will withstand the action of the acids used. By this means a clamp is made which presses evenly across the plate while at the same time the rubber allows the cell to expand or contract during the charge and discharge thereof. The strips $g$ of glass or similar material may be of any width or they may be made in one piece, that is, in the form of a single sheet or plate having an area equal to or greater than the area of the conducting plates. If one sheet of glass be employed at each end of the cell, several strips of rubber $k$ may be used at each side of the cell to secure the plates together.

For the purpose of increasing the capacity of the porous plates for holding the electrolyte and insuring a greater supply of electrolyte in the plates when the cell is in use, I prefer to make each plate in two parts or halves as shown Figs. 4 and 5. These are laid side by side when the cell is built up, forming what is equivalent to a single porous plate split centrally. As the plates are slightly rough on the surface they can not be clamped together so tightly as to exclude the passage of the electrolyte which will be taken up by capillary attraction in the aperture between the halves or portions of the compound plate.

If desired, slight grooves or apertures may be formed in the proximate faces of the portions of the plate as shown in Figs. 4, 5 and 6, so that when the portions are laid together there will be distinct passages or canals. These passages if desired may be made to branch in different directions between these portions of the plate, as shown in Fig. 6, which is merely a diagram intended to represent the branching of a series of channels. In this way the amount of electrolyte contained in the plates and between the masses of active material on either side thereof may, if desired, be materially increased and free movement allowed between the spaces within the plate and the mass of electrolyte outside the plate, which greatly assists in maintaining uniformity of density throughout the whole mass of electrolyte. The absorptive or holding capacity of the porous plates when the latter are not in two parts or halves might be increased by boring or otherwise forming very small apertures or canals in them which would pass in from the edges toward the center or through the plate from edge to edge, and this method of increasing the capacity of the plates to hold the electrolyte I consider to be within the invention although not so desirable, and I prefer the method above described for obtaining the same result.

What I claim is:

1. An accumulator composed of one or more porous plates which receive and support the active material, and suitable conducting plates, said porous plates having canals or apertures passing in from the edges thereof, for the purposes and substantially as shown and described.

2. An accumulator composed of one or more porous plates which receive and support the active material, and having suitable conducting plates alternating therewith, said porous plates being composed of two parts in contact with one another and having the active material directly applied to their outer surfaces, substantially as shown and described.

WM. A. MACLEOD.

Witnesses:
 ROBT. WALLACE,
 C. E. NOLTE.